P. Noyes.
Apparatus for Measuring Liquids.
N° 96340. Patented Nov. 2, 1869.
Sheet 1-2 Sheets
Fig. 1 Sectional Views Fig. 2
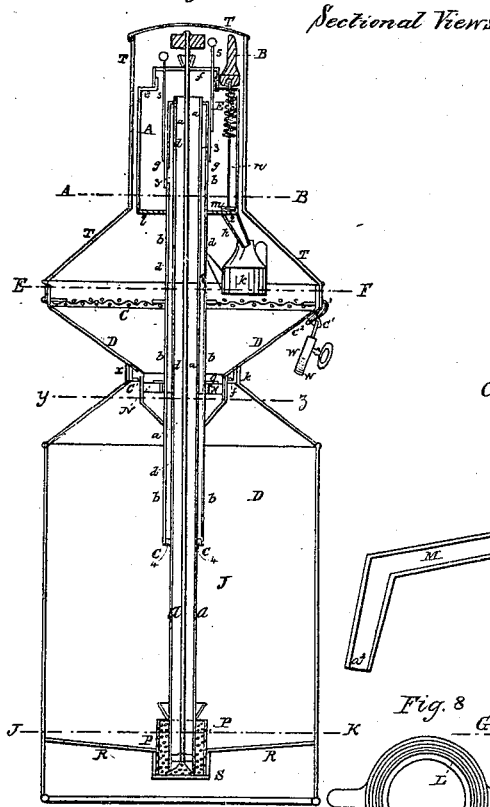
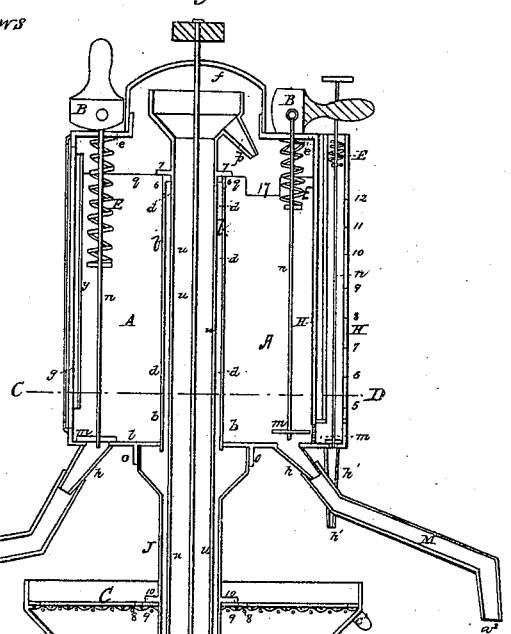
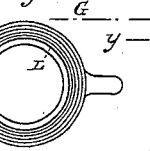
Fig. 8
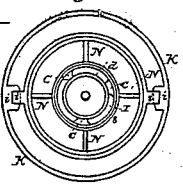
Fig. 12
Fig. 14
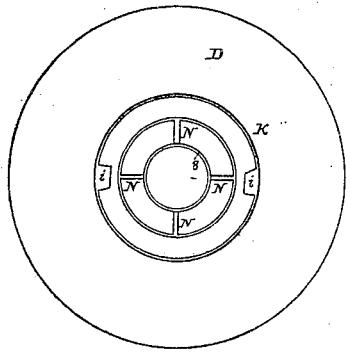
Fig. 9
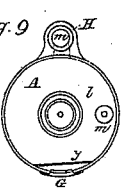
Witnesses
John E. Jerome
Charles [illegible]
Inventor
Person Noyes

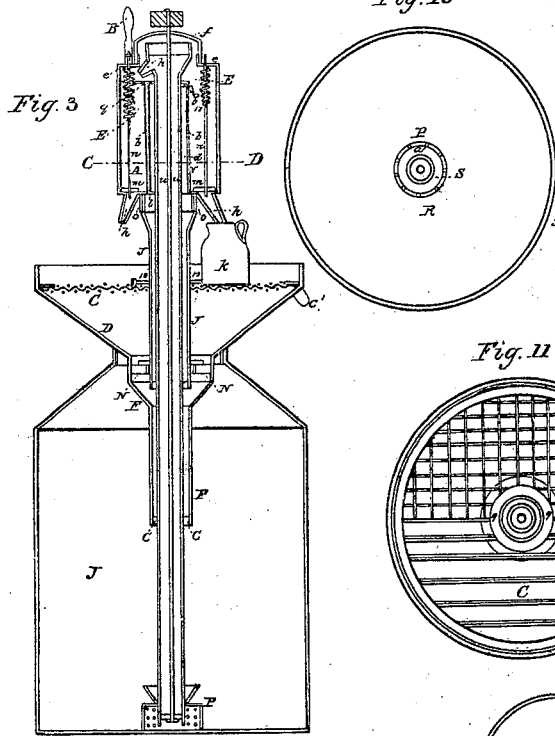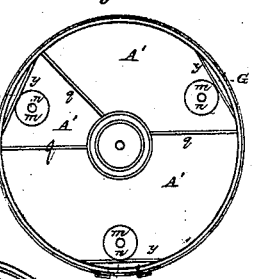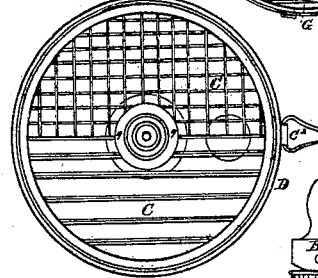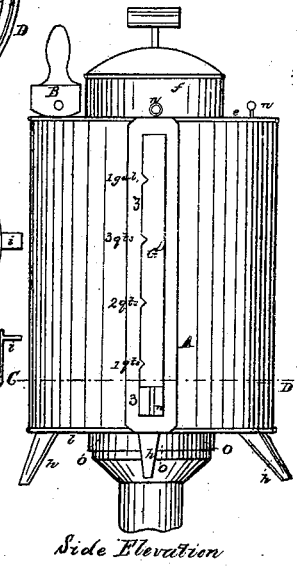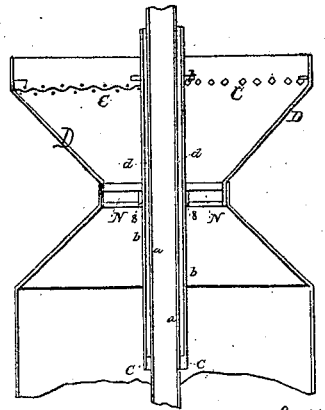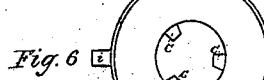

United States Patent Office.

PERSON NOYES, OF LOWELL, MASSACHUSETTS.

Letters Patent No. 96,340, dated November 2, 1869.

IMPROVEMENT IN APPARATUS FOR MEASURING LIQUIDS.

The Schedule referred to in these Letters Patent and making part of the same.

*To all whom it may concern:*

Be it known that I, PERSON NOYES, of Lowell, in the county of Middlesex, and State of Massachusetts, have invented certain new and useful Improvements in the Apparatus for Pumping or Drawing and Measuring Liquids, of which the following is a full, clear, and exact description, reference being had to the accompanying drawings, making part of this specification, in which—

Figures 1, 2, and 3, each represents a vertical central section, figs. 1 and 3 as applied and used with an oil-jar or can, and fig. 2 with a cask or barrel.

Figure 4 represents a vertical central section of a portion of the top of an oil-jar, with the conical cover D, showing the manner of applying and using the return-tube $b$ and pump, without the use of the lower return or tunnel-top tube F, seen in figs. 2 and 3; also, in Figures 5 and 6, a central section and top end view, the latter being more particularly designed for applying the apparatus to a cask, as shown in fig. 2.

Figure 7 represents a side elevation of the measuring-tank, shown in figs. 1, 2, or 3, with a central conducting or return-tube, I, which supports the tank when the apparatus is used for pumping from a cask, as shown, and conducts the overflow of liquid from the measure back into the cask through the lower return-tube F.

Figure 8 represents a bottom end view of the bung-hole bushing L, seen in fig. 2.

Figures 9, 10, 11, 12, and 13, represent each a horizontal section—fig. 9 on the line A B of fig. 1; fig. 10 on the line C D of figs. 2, 3, or 7; fig. 11 on the line E F of fig. 1, except one-half of the grating; fig. 12 on the line G H of fig. 2; and fig. 13 on the line I K of fig. 1, except that in figs. 2 and 9 a tubular glass, 11, is shown, instead of the flat glass G, shown in fig. 7.

Figure 14 represents a bottom end view of the conical cover D, from or above the line Y Z of fig. 1 or 2.

This invention relates to a new and improved apparatus for pumping or drawing and measuring oils or other liquids. It is designed to be used in manufactories, machine-shops, stores, or other places where facility, convenience, neatness, and economy in measuring and dealing out oils, or other liquids, are objects of some importance.

In constructing my improved pumping and measuring-apparatus, as shown in fig. 1, I take an ordinary suction-pump, the tube $a$ of which may be of wood or metal, or any other material; but for convenience in fastening some of the parts to the pump-tube, as in the present instance, I use common sheet-tin.

From the top, or near the top of this pump-tube, and extending downward a suitable distance, a conducting-tube, $b$, surrounds the tube $a$, leaving a space, $d$, between the two tubes.

This space $d$ is closed at the top, but the lower end is left open, except some small stays, $c$, which hold the inner tube centrally and steadily within the outer one. These stays $c$, and the manner of employing the tubes above named, are more clearly shown in fig. 4, also in figs. 5, 6, and 12, the latter being a section of fig. 2, on the line G H thereof.

Surrounding the top portion of the tube $b$ is a measuring-tank, A, the bottom of which is fastened to, and made water-tight around the outside of the tube, while the top of the tank rises above the top of the tube, and is closed by a cover, $f$.

Through the bottom of the tank, and near one side, a hole, 2, is made, and a draught or outlet-tube, $h$, surrounds this hole, and projects downward and outward, as shown, so as to serve as a convenient conductor for oil from the tank or measure to a small can, $k$, or a jug, held beneath it.

Above the bottom $l$ of the tank, a valve, $m$, covers the hole 2, before described, and this valve is lifted by a rod, $n$, the lower end of which is connected to the valve, and the top end may be pivoted to a lever, or a rocking cam, B, shown in figs. 1, 2, 3, and 7.

The valve is forced down on to its seat by a spiral spring, E, the lower portion of which is fastened to the valve-rod $n$, while the upper end presses against the under side of the top $e$ of the tank to hold the valve down.

Turning the handle of the rocking cam downward to a horizontal position, as shown in fig. 2, raises the valve $m$, and holds it up while the contents of the measuring-tank, or any part thereof, are discharged through the tube $h$. The handle of the cam is then raised to a vertical position, when the spiral spring E presses the rod $n$ and the valve $m$ down on to its seat, around the hole 2 through the bottom of the tank.

In fig. 10, I have shown a section of a tank, divided into three compartments A', each of which serves as a measure of a different capacity.

The tank shown in fig. 1, a section of which is shown in fig. 9, has no compartments. In the former, the liquid is pumped up from the jar or the cask, and discharged into either compartments through the nose $p$ of the pump, shown in fig. 2 or 3, and the tank or the pump is moved round to bring the nose of the pump over any compartment in the series.

The quantity each compartment shall hold, for accurate measurement, may be graduated by the height of the partitions $q$, or by notching, as at 17, the top edge of each or either partition, allowing the surplus oil from a filled measure or compartment to flow over into the next compartment to be measured. Or, if desired, it may be discharged, by raising the valve in such compartment, and allowing the liquid to pass through the tube $h$ into a receiver, or back into the cask or the jar, through the platform grating C and the conical cover D, and through the lower conducting-tube F.

In the latter case, viz, as shown in fig. 1, the oil is pumped up, as in the former, but here the oil flows over the top of the pump-tube, and the upper conducting-tube, into the tank, where the quantity of oil is graduated by its height in the measure, and indicated by points, arranged to cover, or partly cover, a vertical glass, G, set in the side of the tank, as shown in fig. 7.

The points should have marks set against each to indicate the quantity of oil in the tank and being measured. For example, the lower point indicating one quart, and marked 1 qt.; the next lowest point, 2 qts.; the next, 3 qts., and so on; or there may be subdivisions or marks to indicate smaller quantities, and thus measure any quantity desired.

The last above-described parts or devices, which will be recognized as figured gauges, to indicate the measurement of oil or liquids, are old and well known, and I make no claim for them, or other like elements hereinafter described.

In measuring liquids in a tank or measure having no compartments, as shown in figs. 1 and 9, I form openings, 3, through the outer tube $b$, and these openings are covered by sliding gates $g$, operated by vertical rods 5 passing through the cover $f$ of the tank.

When a small quantity of liquid is to be measured, a sufficient quantity is pumped up into the tank, and the gate which covers the lower opening 3 is slid upward to uncover said opening, and the surplus liquid allowed to pass off through the space $d$, and out at the lower end 4 of the tube $b$ into the jar J, the liquid remaining in the tank being a gill, pint, or quart, or other quantity which the tank is or may be graduated to hold when filled to the lower side of said lower opening.

A can, jug, or other receiver, is then placed beneath the lower end of the outlet-tube $h$, and the handle of the rocking cam turned downward, which raises the valve $m$, and the liquid passes from the measure or tank into the can or other receiver.

In figs. 2 and 9, I have shown tubular or cylindrical indicators, H, (which should be of glass.) That in fig. 2 is marked to indicate small quantities of liquid, to be measured and drawn from the tank.

Beneath the lower end of the tubular indicator, or in a space made for the purpose, a valve, $m$, like those in the tank, is arranged, with an outlet and a tube, $h'$, like the others shown.

This valve is also provided with an operating-rod, $n$, which passes up through the glass tube and its cover; and the top end is formed convenient for lifting the valve, or it may be connected with a suitable cam, or other device, which will facilitate the operation of lifting the valve, which is generally closed by a spring, E, as are the others before described.

In measuring liquids in a compartment-tank, instead of allowing the overflow or surplus of liquid to run over the top of the partitions, as before described in reference to figs 2 and 7, the top of the tube $v$, which surrounds the pump-tube $u$, may be notched, as at 6, beneath the collar 7, and the surplus liquid allowed to return to the jar or the cask, through the space $d$, into and through the central return-tube I and the lower tube F.

This tube F may be made as shown in figs. 5 and 6, and applied to the lower part of the conical cover D by locking-lips or projections $i$, extending inward from the flange K, and others extending outward from the upper and enlarged or tunnel-end of the tube, as clearly shown in figs. 2 and 12; or the tube F may be made in one with the conical cover D, as shown in section in fig. 3; and in either form, this conical cover and tube F may be used in a jar or can, as in fig. 3, or in a cask or barrel, as in fig. 2, by first applying (by screwing or by driving) a bushing, L, into the bung-hole of such cask, and by inserting the tube F through the bushing.

The tube F thus applied, and having the conical cover D connected as shown, is ready to receive the pump-tube, with the measuring-tank on the top of it. But when employed as in fig. 2, a central return-tube, I, is used between the lower tube F and the measuring-tank.

This central tube I passes through the centre of the platform grating C, near the top of the conical cover D, and downward inside of a collar or ring, $e$, supported by bridge-work N, secured in the lower end of the conical portion D, and this holds the lower end of the tube I.

The central portion of the latter tube is supported by a collar, 9, secured to the top of the grating, and fitting the outside of the tube, and by a flange, 10, projecting from the exterior of the latter.

The measuring-tank A rests on the top of the enlarged or tunnel-shaped upper end of the tube I, and is held in position by a circular flange, $o$, which depends from the bottom of the tank.

The pump-tube $a$ is inserted through the top of the tank, (the cover $f$ being on the pump-rod,) and through its centre downward through the tubes I and F, and into the cask, the cover $f$ pressed down, and the apparatus is ready for operation, either for pumping and measuring liquids, and discharging the same into oilers, cans, or other receivers; or, if desired, for pumping the whole or a portion of the liquid contained in a cask, and (with or without measuring) discharging it into one or more jars or casks of smaller capacity; or for pumping and discharging the contents of one, two, or more small casks or jars into one larger one.

This is done by the use of a zigzag pipe, M, applied to one end of an outlet or discharge-pipe, $h$, raising the valve which covers the outlet, as in fig. 2, and by turning the nose $p$ of the pump to a position to discharge the pumped-up liquid into the compartment where the valve is raised, allowing such liquid to pass from the compartment beneath the raised valve through the tube $h$ and the pipe M, and out at its lower end $a^2$, and into a jar set in the position of that shown in fig. 3, through the grating C, the conical cover, and the lower tube F.

The pump may be provided with two or more noses, and while pumping and discharging from one compartment, measuring liquid and filling cans or jugs may be done from any one or more of the others.

All the above-described operations of pumping and discharging liquid, and filling cans or jars or casks, may be performed in a similar manner by the apparatus shown in fig. 1, by increasing the number of outlet-tubes and valves and other suitable parts.

In pumping, or in pumping and measuring oil or other liquid from a flat-bottom jar, I generally employ the common strainer P, which may be of woven wire or perforated tin, or any other well-known strainer material, and no other strainer is necessary in any part of the apparatus.

In pumping liquid from a flat-bottom jar, as shown in fig. 3, it is impossible to fully empty the jar by pumping. A portion of the liquid will, of necessity, be left in the bottom, as the lower end of the pump-tube must be notched or perforated, to allow the liquid to be drawn in by the suction when the pump is operated.

To overcome this difficulty, and to provide for more fully emptying the jar, I raise the bottom R and sink the step S, making the bottom dishing and lowest at and around the sunken step, and insert the strainer and the lower end of the pump into the step. A jar thus constructed, with the sunken step and dishing bottom, may be more fully pumped out, or emptied by pumping, as the smallest quantity of liquid in the lower part of the jar will run toward the centre of the dishing bottom and into the step, which need be but a trifle larger than the pump-tube, and from which step nearly all the liquid may be drawn by the pump.

The platform grating C may be of woven wire, or of slats or grates, with their upper and lower edges sharp, or square grates, set with their corners upward, as seen in fig. 4, at one side of the conical cover D, or in fig. 11, so that any oil or other liquid dropped or spilled on the platform, or passed through it from a tank or measure, may not be retained on the platform to corrode or gum up the grating, or to evaporate and waste, or be liable to ignition, explosion, or other objectionable or disastrous results which might occur if the platform were of any perforated flat-surface material, so commonly used for similar purposes.

This improved apparatus, whether used with a cask or a jar, or other liquid-holder, is provided with a cap, T, which is fitted to the conical cover D of the jar, as clearly shown in fig. 1.

This cap encloses the whole top-portion of the apparatus, and is fastened to the cover by a staple, $c^1$, a hasp, $c^2$, and a padlock, W, so that no liquid can be drawn from the jar or the cask by the apparatus in the absence of the person having the key.

This cap serves also to prevent dust or dirt getting in or upon the tank A or the grating C, and prevents the escape of volatile liquid by evaporation, and renders the whole apparatus comparatively safe from fire.

When the cap T is removed, there can be no great danger of fire being communicated to the oil or other liquid from the flame of a lamp, as the cover $f$ of the tank prevents such an operation, and it would seem hardly possible that sufficient vapor for ignition could rise through the space $d$ between the lower return-tube F and the pump-tube $a$.

When the flat glass G is used with points to indicate the height of liquid in the measure or tank, I generally apply a reflector, $y$, within the tank, and a short distance back of the glass, so that the top line or surface of the liquid in the measure may be readily seen between the glass and the reflector, the latter of which may be a strip of bright tin, or other suitable material.

When the tubular glass indicator is employed with a valve and operating-rod and outlet-tube $h'$, as in fig. 2, the sliding gates $g$ and rods 5 may be dispensed with; and I consider one equivalent to the other, and both very convenient in measuring liquids, as described.

A pump-tube (with a measuring-tank and other apparatus, as described,) may be of sufficient length to extend from a cellar to the first or second floor above, and oil or other liquid pumped up from a cask or other liquid-holder, in such cellar, and measured and put up in such upper room. By this means, oil or other liquid may be constantly kept in a cellar, where the low temperature prevents rapid evaporation, thereby economizing room in upper apartments, preventing waste and loss of liquid, and offensive odors, and keeping such upper apartment comparatively clean.

When the pump and the measuring-apparatus are removed from the cask and the jar, and the loose grating C removed from the top of the conical cover D, (or not,) said conical jar-cover, with the tube F, combined as shown in figs. 2 or 3, may be used as a tunnel for any ordinary purpose.

I am aware that valves have been raised from their seats by cams, and forced back by spiral springs.

I am also aware that a pump has been used, the nose or outlet of which could be turned to discharge liquid on either side of the pump.

I disclaim having invented either of these devices.

I am also aware that the combination of a pump-top, provided with a measuring-gauge, and the spout or nose, provided with a stop-cock, are old and well known; and I disclaim such, or any other combination as arranged in connection with the pump and the can, in the application of Eli F. Wilder; but What I do claim, and desire to secure by Letters Patent, is—

1. A pumping and measuring-apparatus, as described, all the parts of which are constructed, combined, and arranged in the manner and for the purpose specified.

2. The tank A, in combination with the pump-tube $a$ and the return-tube $b$, having outlets 3 and gates $g$, as described, and for the purpose specified.

3. The return-tube $b$, having outlets 3 and gates $g$, when combined with the pump-tube $a$, in the manner and for the purpose specified.

4. The combination, with the tank A and with the tube $b$, having outlets 3 and gates $g$, or with the return-tube I and the tube $u$ of the removable pump, and with the conical cover D, constructed and adapted for the purposes described, of a platform grating, C, in the manner and for the purpose specified.

PERSON NOYES.

Witnesses:
JOHN E. CRANE,
CHAS. HUNT.